Oct. 7, 1930.      J. J. COFFEY ET AL      1,777,292
GEARING
Filed June 27, 1928       3 Sheets-Sheet 1

INVENTORS
John J. Coffey and
Carl G. Nordstrom.
BY R. S. C. Dougherty.
ATTORNEY

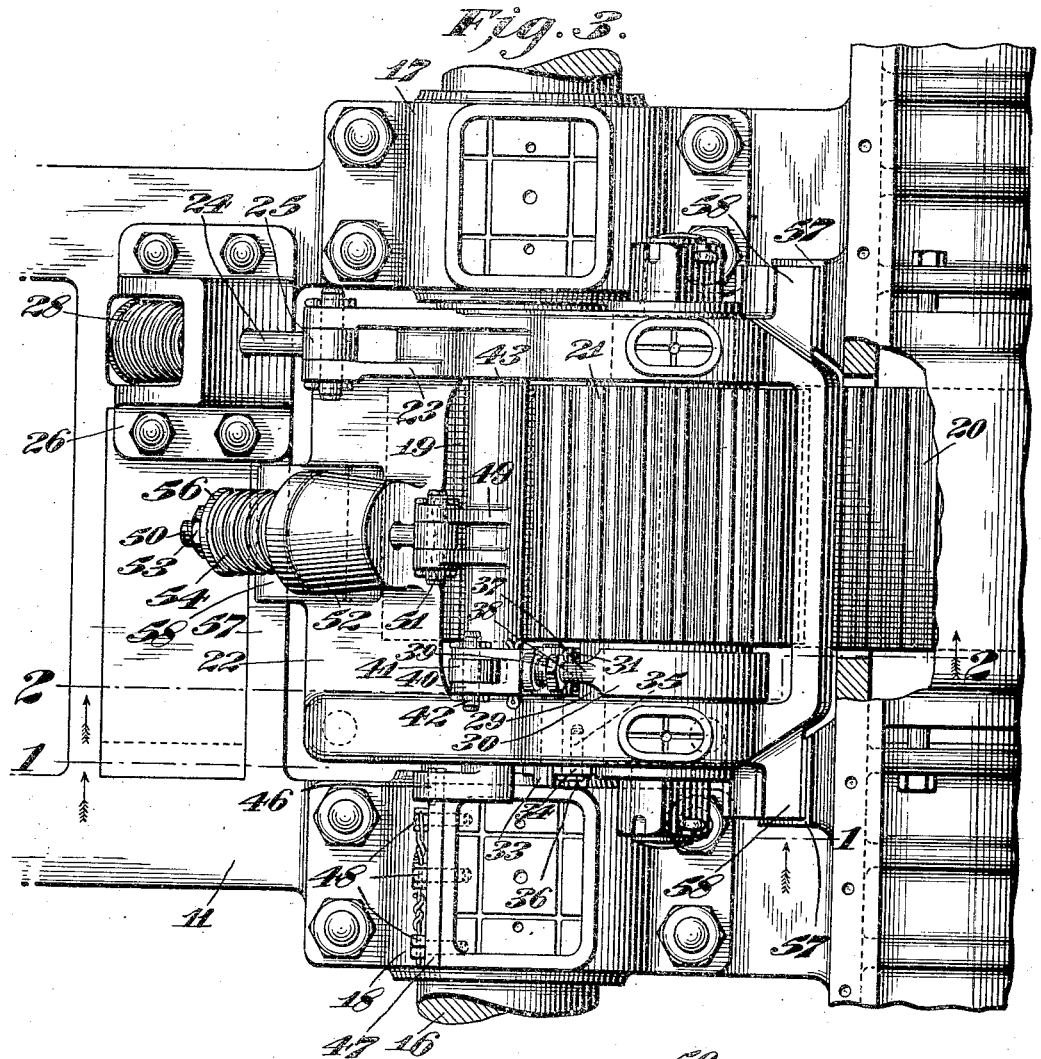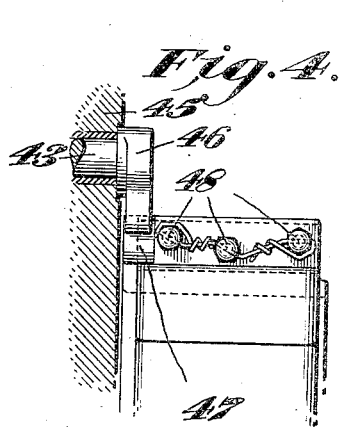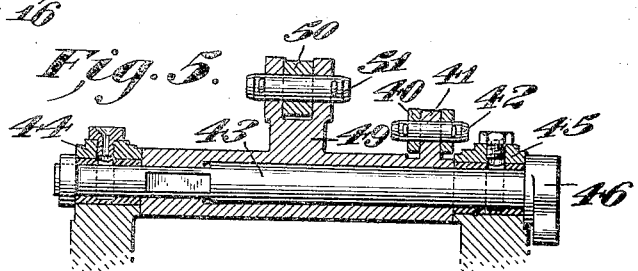

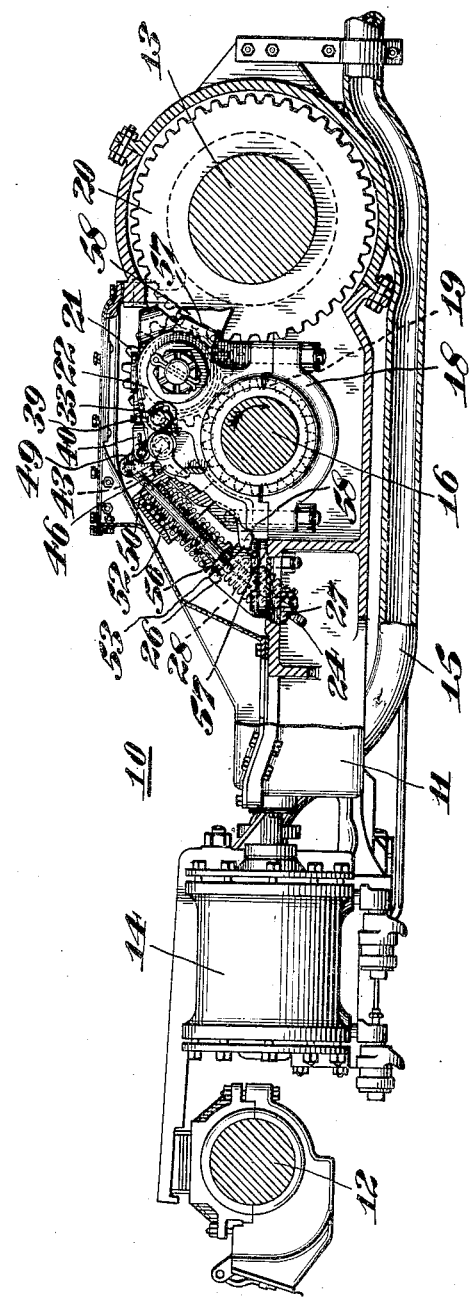

Patented Oct. 7, 1930

1,777,292

UNITED STATES PATENT OFFICE

JOHN J. COFFEY AND CARL G. NORDSTROM, OF BETHLEHEM, PENNSYLVANIA, ASSIGNORS TO BETHLEHEM STEEL COMPANY

GEARING

Application filed June 27, 1928. Serial No. 288,663.

Our invention relates to gearing and more particularly to gearing of the connectible and disconnectible tumbler type.

In connection with the problem of transmitting power from an auxiliary engine or motor, for example, the application of auxiliary engines to the tender trucks of locomotives, it has heretofore been the practice of using a train of gears to secure operative relations between the auxiliary engine and the axle of the tender truck which could be entrained and disentrained at will by placing in the circumferential path of rotation of the idler gear means which engages the teeth of this gear and prevents said gear from rotating about its own axis.

The object of this invention is to provide apparatus of the character which shall operate automatically to connect and to disconnect the idler gear from the driven gear in consequence of the rotation or the cessation of rotation of the driving gear in a given direction.

Another object of our invention is the provision of a novel and simple means adapted to cooperate with a railway vehicle propulsion unit to automatically cause the latter to be operatively connected to a driven axle of such vehicle during the initial operation of the propulsion unit.

Broadly stated, our invention comprises a drive shaft to which is fixedly mounted a driving gear, a driven shaft having a driven gear fixedly mounted thereon and in alignment with the driving gear, an idler gear constantly meshing with the latter gear and normally constrained out of engagement with the driven gear, friction means to retard the rotation of the idler gear about its own axis during the initial rotation of the driving gear, said idler gear being rotatably mounted on a movable bracket so that the initial rotation of the driving gear causes the idler gear to have a planetary movement about the axis of the driving gear towards the driven gear into driving connections therewith and means to release the friction means to allow free rotation of said idler gear after said driving connection is established.

Other novel features will be more fully understood from the following description and the claims taken with the drawings in which:

Fig. 3 is a top plan view of the apparatus with the cover removed;

Fig. 4 is an elevation view of the cam plate.

Fig. 5 is a sectional view taken on line 5—5 of Fig. 2; and

Fig. 6 is a longitudinal cross-section through an auxiliary locomotive embodying our invention.

Figure 1:
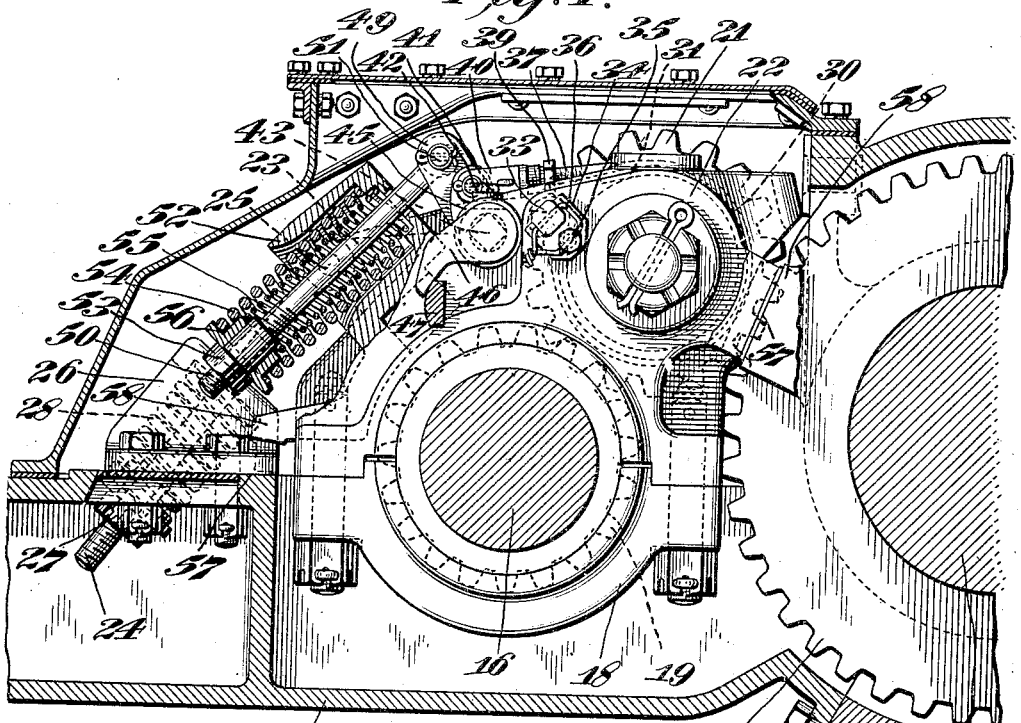
Fig. 1 is a cross sectional view of our invention taken on line 1—1 of Fig. 3.
Figure 2:
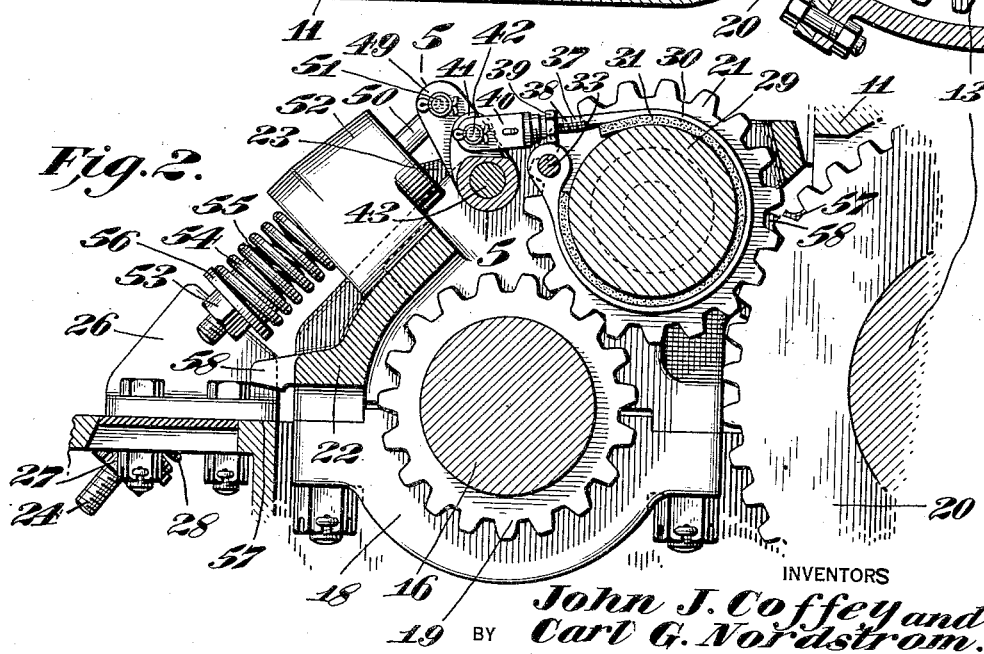
Fig. 2 is a cross sectional view taken on line 2—2 of Fig. 3.

Referring to the drawings more in detail 10 designates generally an auxiliary locomotive propulsion unit, the frame 11 of which is mounted on the load bearing axles 12 and 13 of a railway vehicle, preferably the locomotive tender. The engine 14 is supplied with steam from the locomotive boiler by the pipe 15 and drives the crank shaft 16 which is mounted in suitable bearings 17 and 18 upon the frame 11.

The aforementioned crank shaft is provided with a driving toothed gear 19 and the axle 13 is provided with a driven toothed gear 20, said gears being disposed in alignment with each other. An idler gear 21 is constantly in mesh with the driving gear 19 and it is maintained in this relation by the idler gear shifter bracket 22. The bracket 22 is capable of angular movement with respect to the axis of the driving gear 19, so that the idler gear 21 has a planetary movement about the same when moving into and out of mesh with the driven gear 20, as hereinafter set forth.

An arm 23 extends rearwardly from the bracket 22 and is provided with a rod 24 pivoted thereon at 25. The rod 24 extends downwardly through an aperture formed in the bracket 26 which is fastened to the frame 11. The end of the rod 24 is threaded and is provided with an adjusting nut 27. Interposed between the nut 27 and the bracket 26 and surrounding the rod 24 is a coil spring 28 which serves normally to constrain the bracket 22 and hold the idler gear out of mesh with the driven gear.

In order that the idler gear 21 may be positively moved towards the driven gear when the driving gear is rotated, it is necessary that rotation of the idler gear about its own axis be retarded, and to this end, we provide the idler gear 21 with a drum 29 around which is placed a band 30, having a lining of friction material 31, which is normally in engagement with the drum. One end of the band 30 is anchored to the bracket 22 by the bolt 33. A plate 34 is provided to hold the band 30 on the bolt 33, this plate being fastened to the bracket 22 by the stud 35 which is locked in position by the wire 36. The other end of band 30 is formed into a rod 37 which is threaded at 38 to receive a telescopic adjusting nut 39 which has inside and outside oppositely disposed thread and which also screws into the clevis 40. The clevis 40 is pivotally connected to the rocker member 41 by the pin 42. The member 41 is assembled in fixed relation with the shaft 43 which is pivotally mounted in bearings 44 and 45 carried by the bracket 22. A cam 46 is provided integral with the shaft 43 and is so positioned that it will contact with the cam plate 47 which is fastened to the frame 11 by the studs 48.

The member 41 is also provided with a yoke 49 in which the rod 50 is pivotally mounted on the pin 51. The rod 50 extends downwardly through an aperture formed in the bracket 52 which is integral with the shifter bracket 22. The end of the rod 50 is threaded and is provided with adjusting nut 53. Interposed between the nut 53 and the bracket 52 and surrounding the rod 50 are coil springs 54 and 55. A washer 56 is provided between the nut 53 and the springs 54 and 55 and forms a seat for these springs. The springs 54 and 55 serve normally to bias the member 41 and yieldingly hold the band 30 in frictional engagement with the drum 29 through the medium of the friction material 31.

In operation, when the engine 14 is supplied with steam through the pipe 15 the crankshaft 16 together with the driving gear 19 is turned in the direction of the arrow shown in Fig. 6, which tends to rotate the idler gear 21, but as the rotation of the idler gear 21 about its axis is retarded due to the frictional engagement of the lining 31 of the band 30 with the drum 29, the shifter bracket 22 and the idler gear 21 are moved together in their relative position in an entraining direction until the teeth of the idler gear commence to mesh with the teeth of the driven gear 20, whereupon the engagement of the cam 46 with the cam plate 47 causes the shaft 43, carrying rocker member 41, to be rotated in a clockwise direction, thus causing the band 30 to be released from the drum 29 and the springs 54 and 55 to be compressed. Further rotation of the driving gear 19 will cause the teeth of the idler gear to be drawn further into mesh with the driven gear due to the resultant of the working forces set up between the gears. The spring 28 is now in a compressed condition. In order to limit the movement of the idler gear toward the driven gear, we provide on the frame 11 stops 57 against which the faces 58 of the shifter bracket abut when the teeth of these two gears are in their proper relation to transmit power from the driving gear to the driven gear.

The relative arrangement of the gears and the direction of rotation thereof is such that while power is being transmitted from the engine unit to the driven gear the idler gear is maintained in mesh with the latter gear solely by the resultant of the working forces set up between the teeth of the respective gears.

When the engine 14 is shut off, power is no longer transmitted therefrom to the driven gear, and the working forces between the teeth of the gears are relieved to such an extent that the spring 28 causes the disentrainment of the idler gear from the driven gear. Upon the disentrainment of the idler gear from the driven gear the cam 46 disengages from the cam plate 47 and thus allows the rocker member 41 to return to its original position due to the action of the springs 54 and 55. This movement of the member 41 causes the frictional material of the band 30 to enter into engagement with the drum 29, and the mechanism is now in its normally idle position.

It will be seen from the foregoing that we have devised a novel and simple arrangement of gearing which is especially useful for automatically entraining an auxiliary locomotive propulsion unit with a normally idle axle of a railway vehicle.

While we have shown our invention in but one form, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

Having thus described our invention what we claim as new and desire to secure by Letters Patent is:

1. In a gearing mechanism, the combination of a drive shaft, a driving gear operatively connected to said shaft, a driven shaft, a driven gear operatively connected to said shaft, an idler gear constantly meshing with the driving gear and normally out of mesh with the driven gear, a bracket capable of angular movement carrying the idler gear, a friction band normally engaging said idler gear to retard the rotation thereof, one end of said band being connected to said bracket, a shaft rotatively mounted on said bracket, means connecting the other end of said band to said shaft, means constraining said band into engagement with said idler gear, a cam mounted on said shaft and means adapted to engage said cam and rotate said shaft upon the angular movement of said bracket thereby relieving the pressure of said band on the idler gear.

2. In a gearing mechanism, a driving gear, a driven gear, an idler gear constantly meshing with the driving gear, a carrier member for the idler gear adapted to move angularly to carry the latter from its normally demeshed position to its meshed position with respect to the driven gear, a friction band normally engaging said idler gear to retard its rotation, a rock shaft mounted on said carrier member, means connecting one end of said band to said carrier member, means connecting the other end of said band to said rock shaft, and means coacting with the angular movement of said carrier member adapted to rock said rock shaft.

3. An auxiliary locomotive propulsion unit, the combination of a drive shaft, a driving gear operatively connected to said shaft, an axle, a driven gear operatively connected to said axle, an idler gear meshing with the driving gear, a bracket for the idler gear, an energy storing device for biasing the bracket for movement away from the driven gear, a stop for limiting said movement, a drum integral with the idler gear, a friction band in engagement with said drum when the bracket is in engagement with said stop, whereby, when the driving gear is turned in one direction, the bracket and its idler gear will be translated angularly to mesh the idler gear with the driven gear, a shaft mounted on said bracket, a rocker member mounted on said shaft, means connecting one end of the friction band to the bracket, means connecting the other end of the band to the rocker member and means coacting with the angular movement of said bracket adapted to rock said rocker member, thereby releasing the friction band from the drum of the idler gear during the movement of the idler gear toward the driven gear.

4. In an auxiliary locomotive engine, a driving gear, a driven gear, an idler gear constantly meshing with the driving gear, a carrier member for the idler gear adapted to move angularly to carry the latter from its normally demeshed position to its meshed position with respect to the driven gear, means constraining said idler gear in its normal position, a friction means engaging said idler gear to retard its rotation, means mounted on said carrier member to constrain said friction means into engagement with said idler gear, a shaft mounted on said carrier member, a rocker member mounted on said shaft, means connecting one end of the friction band to the carrier member, means connecting the other end of the friction band to the rocker member, and means coacting with the angular movement of said carrier member adapted to rock said rocker member to relieve the pressure of the friction means upon the idler gear.

In testimony whereof we hereunto affix our signatures.

JOHN J. COFFEY.
CARL G. NORDSTROM.